Dec. 13, 1966 R. DALLY 3,291,488

TONE ARM AND CARTRIDGE COMBINATION

Filed April 2, 1964 2 Sheets-Sheet 1

INVENTOR:
ROY DALLY
BY Thomas A. Briody
HIS ATTORNEY.

Dec. 13, 1966 R. DALLY 3,291,488

TONE ARM AND CARTRIDGE COMBINATION

Filed April 2, 1964 2 Sheets-Sheet 2

INVENTOR:
ROY DALLY

BY Thomas A. Briody
HIS ATTORNEY.

United States Patent Office
3,291,488
Patented Dec. 13, 1966

3,291,488
TONE ARM AND CARTRIDGE COMBINATION

Roy Dally, Warrensburg, Ill., assignor to General Electric Company, a corporation of New York Filed Apr. 2, 1964, Ser. No. 356,814
3 Claims. (Cl. 274—24)

This invention relates to an improved electro-mechanical transducing assembly for audio reproduction from disc type records, and more particularly to an improved arrangement of a stylus carrying cartridge on a tone arm.

The usual type of phonograph, whether it be of the single-record play or automatic changer variety, includes an elongated tone arm that is mounted near its rearward end for pivotal movement about a substantially horizontal axis. This tone arm carries a pickup cartridge near its forward end, and one or more record tracking styli are carried by the cartridge for playing back a record. In such a sound reproducing mechanism, the cartridge is usually of a relatively fragile construction, and it is advantageous to provide an effective means for protecting this cartridge from severe impacts or abuse. For example, in many prior art sound reproducing mechanisms it has been found that periodic or continuous impacting or jarring of the cartridge often results in undesirable misalignment of the components of the cartridge and/or damage to one or more of the styli, thereby reducing the quality of performance of the cartridge and the fidelity of the audio reproduction system. It is further desirable to provide an effective means for protecting records from undesirable impacts imparted thereto by the cartridge. Such impacts often cause breakage and scratching of the record grooves to substantially detriment the quality of reproduction.

In conjunction with the aforementioned considerations, in designing a tone arm and cartridge assembly it is also extremely important and desirable to provide a structural means for effectively damping vibrations of the cartridge and its mounting arrangement at resonant frequencies.

An important object of the present invention is to provide an improved tone arm and cartridge combination which includes a novel and effective means for protecting the cartridge and/or records from possible damage due to the application of undesirable impacting forces to the phonograph and/or the tone arm.

Another object of this invention is to provide an improved cartridge and tone arm assembly wherein the cartridge is protected from damage incident to accidental dropping of or pressing down on the tone arm in the direction of the record.

A further object of the present invention is to provide an improved tone arm and cartridge mechanism which is efficient, dependable, and economical to manufacture.

A still further object of my invention is to provide a means for pivotally mounting a cartridge on a tone arm in such a manner that the cartridge floats in seesaw fashion upon the tone arm, in combination with a resilient damping means for cushioning relative movement of the cartridge with respect to the tone arm.

Still another object of my invention is to provide an improved supporting arrangement for a cartridge on a tone arm, which arrangement includes a novel damping means for resiliently cushioning movement of the cartridge relative to the tone arm.

In accordance with my invention, in one form thereof, there is provided an elongated tone arm pivotally supported at one of its ends for movement about a substantially horizontal first axis. Near the other end of the tone arm, a carrier member is supported on the tone arm for pivotal movement about a substantially horizontal second axis. A cartridge including a record-tracking stylus is secured to and supported by the carrier member. Means is also provided for balancing the carrier member and cartridge assembly upon the tone arm so that this assembly is allowed to float freely upon the free end of the tone arm in at least one vertical direction of rotation when the record-tracking stylus is not engaged with a record. Means is also included for resiliently damping vertical movement of the cartridge relative to the tone arm when the cartridge is engaged with a rigid surface such as that of a record. With such an arrangement, the pivotal movement of the cartridge relative to the tone arm, in conjunction with the resilient damping means, affords effective protection of the cartridge and records in the event of misuse or abuse of the tone arm and cartridge assemly, and the damping means also efficiently quells vibrations incident to resonant frequencies.

Further aspects of my invention will become apparent hereinafter, and the specification concludes with claims particularly pointing out and distinctly claiming the subject matter which I regard as my invention. The invention itself, however, both as to organization and method of operation, as well as additional objects and advantages thereof, will best be understood from the following description, when read in conjunction with the accompanying drawings, in which:

Figure 9:
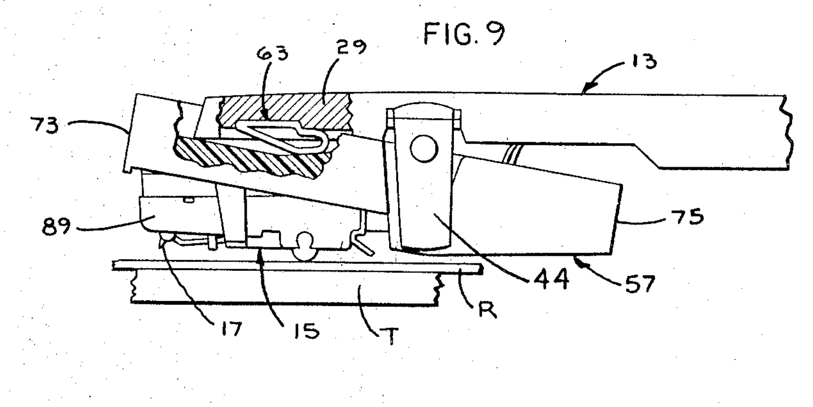
FIG. 9 is a view similar to FIG. 7, showing the relative positions of the cartridge and tone arm after a substantial downward vertical pressure is applied to the top of the free end of the tone arm.

Referring first to FIGS. 1–5, there is shown a cartridge and tone arm assembly 11 embodying one form of my invention. The assembly 11 includes an elongated tone arm 13 having a cartridge 15 mounted thereon. The cartridge 15 has at least one stylus 17 adapted to track in the groove of a sound reproducing record R (FIGS. 7–9).

Figures 1, 2, 3, 5, 6, 7, 8:
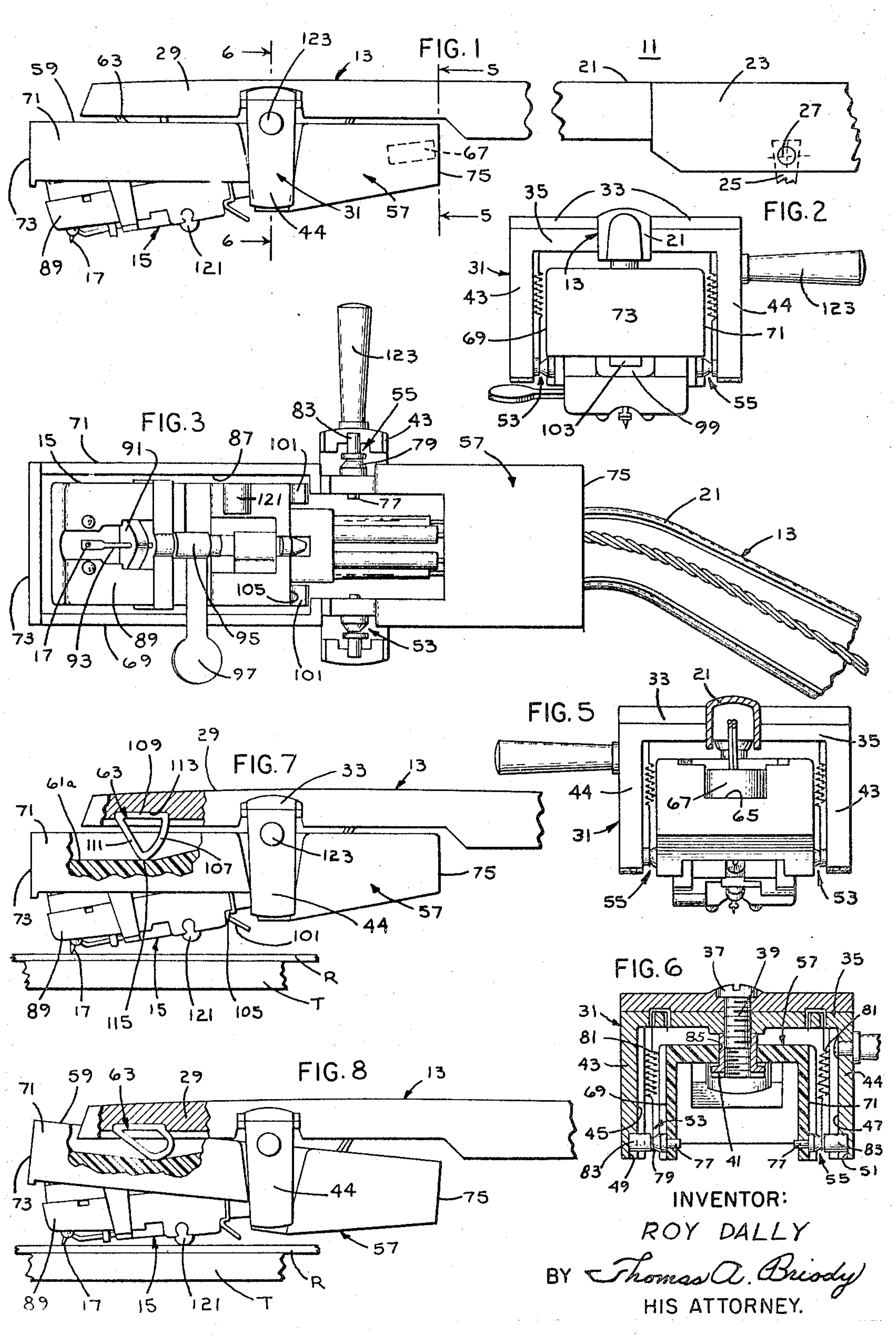
FIG. 1 is a side elevation view of an improved cartridge and tone arm assembly embodying my invention, the cartridge being shown mounted on the free end of a fragmentarily illustrated tone arm.
FIG. 2 is a front view of the assembly shown in FIG. 1.
FIG. 3 is an enlarged bottom view of the assembly shown in FIG. 1.
FIG. 5 is a cross-sectional view taken generally along the line 5—5 of FIG. 1.
FIG. 6 is a cross-sectional view taken generally along the line 6—6 of FIG. 1.
FIG. 7 is a fragmentary view similar to FIG. 1, but showing the cartridge and tone arm partially broken away to illustrate the damping element, and showing the record tracking stylus in playing engagement with a record.
FIG. 8 is a view similar to FIG. 7, showing the relative positions of the cartridge and tone arm after an abnormal downward vertical pressure is applied to the top of the free end of the tone arm.

The tone arm 13 includes an elongated body comprising a tubular arm section 21 extending outwardly in cantilever fashion from pivotally supported portion 23. As shown in FIG. 1, rear portion 23 of the tone arm body is pivotally secured to a suitable support 25, to provide a substantially horizontal tone arm axis 27 about which the tone arm rocks incident to the placing of the tone arm on the record R and lifting the tone arm from the record. The pivoting of the tone arm 13 about the tone arm axis 27 permits a wide range of vertical movement of the tone arm and thereby enables a substantial group of stacked records to be accommodated on the record spindle of an automatic changer without impairing the effective operation of the assembly 11.

To enable the cartridge 15 to be pivotally supported on tone arm 13, there is provided near free end 29 of arm 13, a U-shaped frame 31. More particularly, as shown in FIG. 2, a pair of transverse shoulders 33 are formed integrally to tubular arm section 21 of the tone arm 13 near its free end 29. The shoulders 33 extend outwardly from opposite sides of arm section 21, and are secured in overlying relationship to base 35 of frame 31 by means of the threaded securement of screw 37 (extending downwardly from above arm section 21), as shown in FIG. 6, to the base 35. It will also be noted that the threaded shank 39 of screw 37 (FIG. 6) is long enough so that it extends downwardly for a considerable distance from the bottom of base 35 of frame 31. The reason for this is to enable screw 37 to engage nut 41, which helps to positively couple the cartridge 15 to the tone arm 13, as shall be set forth in detail hereinafter.

The frame 31 is thus rigidly secured to the underside of the tone arm 13 near its free end 29, as shown in FIG. 2, and arms 43, 44 of frame 31 depend in a vertical direction from base 35. On the bottom of the arms 43, 44 of frame 31, at inwardly facing surfaces 45 and 47 thereof (FIG. 6), there is formed a pair of bearing slots 49, 51. The slots 49, 51 receive and pivotally support a pair of trunnions 53, 55, which are rotatably journalled therein to facilitate pivotal movement of the cartridge 15 relative to the tone arm 13.

Turning now to an important aspect of my invention, whereby there is provided an improved means for protecting the cartridge 15 and records associated therewith from possible damage due to sudden and severe jarring, as shown in FIGS. 1, 2 and 6, I have provided a carrier member 57 located exteriorly of and on the underside of free end 29 of the tone arm 13. The carrier member 57 may be fabricated from a readily manufacturable and durable metal such as aluminum, having sufficient mass for the application. The outer periphery of member 57 is generally box-shaped and oblong. Top 59 of member 57 has an elongated recess 61 (FIG. 4) formed therein to enable it to cooperate with a damping element 63 and the free end 29 of tone arm 13. Near the right side of the top 59 of member 57 (viewing FIG. 4), there is formed a recess 65 for receiving a counterbalancing weight 67. (See also FIG. 5.)

Figure 4:
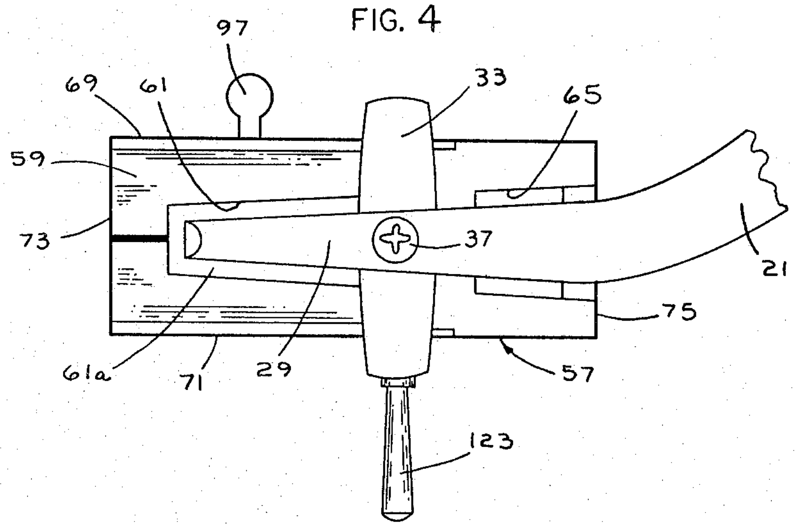
FIG. 4 is a top view of the assembly shown in FIG. 1.

The elongated side walls 69 and 71 of member 57 are arranged in mutually parallel relationship, and they are also parallel to the longitudinal axis of the free end 29 of the tone arm (FIG. 4). Between the front end 73 and rear end 75 of the carriage member 57, but closer to rear end 75 thereof, as shown in FIG. 3, the trunnions 53 and 55 are suitably secured to and project outwardly in transverse fashion from side walls 69 and 71, respectively. Thus, more particularly, as shown in FIG. 6, each of the trunnions 53, 55 includes a shank portion 77 which extends through and is secured to an associated side wall of member 57, an annular notch 79 for receiving the looped bottom end of a tension spring 81, and a rotatable cylindrical section 83 which is seated in one of the bearing slots 49, 51 of frame 31. The member 57 is spring biased upwardly in a vertical direction to engage bearing slots 49, 51 by means of the two tension springs 81, which have their upper looped ends wrapped around associated ribs of the base 35 of frame 31 (as shown in FIG. 6). With such an arrangement, the carriage member 57 is thereby rotatably journalled in the bearing slots 49, 51 of arms 43, 44 of the tone arm.

To help prevent undesirable downward and lateral movement of carriage member 57 from its pivotal support, the bottom threaded section of screw 39 cooperates with headed nut 41, as shown in FIG. 6. Nut 41 extends loosely through an elongated slot 85 formed in the top of the carriage member and has its head located underneath the bottom surface of the top wall of the carriage member 57 wherein slot 85 is located.

Turning now to a description of the arrangement of cartridge 15 in the carriage member 57, attention is directed initially to FIGS. 1–3. As shown therein, the cartridge 15 is mounted within a recessed cavity 87 (FIG. 3) on the underside of carriage member 57 so that its longitudinal axis is inclined downwardly from rear to front at an acute angle relative to the longitudinal axes described respectively by the free end portion 29 of the tone arm (FIG. 1) and the carriage member 57 (viewing FIG. 1). Thus, as shown in FIG. 1, the cartridge 15 is directed downwardly and to the left from the rear to front, and depends from the underside of carriage member 57. It will be further noted that the carriage member 57 is longer on the left side of its pivotal axis (viewing FIG. 1) than on the right side thereof, and that the cartridge 15 is also located on the left side of the axis of rotation of the carriage member.

The cartridge 15 shown is of the ceramic stereo type, and it comprises a housing 89 which may be composed of upper and lower parts attached together by rivets (not shown.) The interior of the housing 89 is partly hollow, and contains a pair of elongated ceramic transducer elements (not shown) and a resilient element 91 for coupling these elements to an elongated drive rod 93. The drive rod 93 has the stylus 17 secured to the underside of its free end (as shown in FIGS. 1 and 7), and it is secured to a barrel member 95 (FIG. 3) which is removably located in cartridge 15. The drive rod 93 and barrel member 95 form a stylus assembly for the cartridge unit, the positioning of which may be adjusted by the rotatable manipulation of an arm 97 which is secured to the barrel member 95.

The cartridge 15 is removably seated in secure engagement with carriage member 57 by means of the cooperation of front and rear clip sections 99 (FIG. 2) and 101 (FIG. 3) respectively, with projection 103 and shoulders 105 of the cartridge housing. Thus, as shown in FIG. 2, projection 103 on the front end of the cartridge housing, extends through a mating aperture of clip section 99, and the rear clip sections 101 engage underneath associated shoulders 105. The cartridge 15 may thus be readily and removably inserted into cooperative securement with carriage member 57.

Turning now to an important aspect of my invention whereby there is provided a means for resiliently cushioning the movement of the carrier member 57 relative to the tone arm 13, attention is directed to FIGS. 7–9. As shown therein, there is provided the resilient damping element 63. The particular construction of the damping element 63 and its mode of operation for transmitting cushioning forces, comprises the invention of William A. Cavagnaro, and this construction and arrangement are described and claimed in his copending application Serial No. 356,815, filed concurrently herewith and assigned to the same assignee as the present invention. The element 63 is made from a rubber-like material; i.e., a material that is highly resilient, readily deformable and has a rapid and complete restoring force so that it will quickly return to its original shape upon being deformed and then released. Butyl, having a Shore "A" durometer hardness range of from about 35 to 55, is a suitable rubber-like material, as is rubber itself.

As shown in FIG. 7, the element 63 is formed in the general configuration of a triangle which has one outwardly concave side 107 joined to a pair of intersecting equilateral sides 109 and 111. The upper side 109 (FIG. 7) of the element 63 is suitably secured to a surface 113 formed in the recessed underside of tone arm 13, near the extreme free end thereof. The lower corner 115 of the resilient element 63 engages the bottom horizontal surface 61*a* of the recess 61 of carriage member 57 and compressibly cooperates therewith to cushion the relative movement of cartridge 15 relative to tone arm 13, in the manner illustrated by a comparison of FIGS. 7–9.

For normal playing operation, as shown in FIG. 7, the stylus 17 of cartridge 15 is in normal playing engagement with the grooves of record R upon turntable T. The longitudinal axis of carriage member 57 and the longitudinal axis of the free end 29 of the tone arm are then generally parallel to the surface of the record R. With the cartridge 15 and tone arm 13 in this position, the corner 115 of element 63 engages and exerts a relatively small compressive force upon surface 61*a* of the carrier member 57. This force is exerted in a vertical direction (viewing FIGS. 7–9) and it provides a shock absorbing effect for protecting the cartridge and its components as well as records being played, during the normal operation of the phonograph and tone arm cartridge assembly.

At certain frequencies, depending upon the resonant frequency of the cartridge and its mounting, the assembly will usually resonate. By using a resilient damping means such as element 63 between the cartridge and tone arm, the resultant vibrations incident to the resonant frequency of the cartridge and mounting are effectively quelled.

It will thus be seen that the triangular shaped elastomeric element 63 provides a flexible mechanical connection between the pivoted cartridge supporting carrier 57 and the free end 29 of the tone arm 13, which provides stability of operation and performance of the tone arm and cartridge assembly, and in particular it also provides a shock absorbing protection for the cartridge and components against vertically directed forces.

As further examples of the protection provided by the resilient element 63, attention is also directed to FIGS. 8 and 9. For FIG. 8, an abnormal downward vertical force is imparted to the top of the free end of the tone arm. The longitudinal axis of member 57 is thereupon directed upwardly and angularly from the surface of record R (from rear 75 to front 73 of member 57). The free end tip of tone arm end 29 enters recess 61 of member 57. The element 63 thereupon compresses to a greater degree, as shown in FIG. 8, to resiliently cushion the relative movement of the cartridge carrying member with respect to the free end of the tone arm.

As shown in FIG. 9, when a substantial downward vertical thrust is imparted to the top of the free end 29 of the tone arm 13, the resilient element 63 is compressed substantially to effectively cushion the relative movement of the cartridge carrier 57 with respect to tone arm 13.

As further illustrated in FIGS. 7–9, on the bottom side of the cartridge housing 89, near shoulders 105 thereof (FIG. 7) there is arranged a resilient bumper 121. The resilient bumper 121 includes the semi-cylindrical bottom which faces downwardly from the bottom of the cartridge housing and is arranged for resilient engagement with a record in a manner illustrated in FIGS. 8 and 9.

Bumper 121 serves as a cushion to help protect the record against otherwise possible abrasion due to engagement of the cartridge housing 89 with the record. In addition, resilient bumper 121 also serves as a fulcrum to enable the cartridge supporting carriage 57 to pivot thereabout for disengagement of the stylus 17 from a record upon the exertion of a substantial downward vertical force on the upper surface of the free end 29 of the tone arm 13.

As shown in FIG. 8, a sufficient downwardly directed force has been exerted on the free end of the tone arm 13 to cause the bumper 121 to protectively engage the surface of record R, but this force is not sufficient for pivoting the carriage member 57 about bumper 121 to thereby cause the stylus 17 to disengage the record. However, as shown in FIG. 9, a substantial vertical force has been exerted upon the free end of the tone arm and as a result of the magnitude of this force, the carriage member 57 has pivoted in a clockwise direction of rotation (viewing FIG. 8) about fulcrum bumper 121 until the stylus 17 disengages the record R.

The particular construction of the resilient bumper 121 and its arrangement and utilization for protecting the record R and enabling the cartridge carrying member 57 to pivot in such a manner that the stylus 17 readily disengages the record R upon the exertion of a substantial downward vertical force, comprises the invention of William A. Cavagnaro and this construction and arrangement are described and claimed in his copending application, Serial No. 356,820, filed concurrently herewith and assigned to the same assignee as the present invention.

As further shown in FIGS. 3 and 5, to enable the tone arm 13 to be readily removed from a record in manual fashion, or otherwise manipulated, an elongated handle 123 is arranged on upright section 44 of the frame 31 of the tone arm 13. Handle 123 may be readily grasped by the operator of the phonograph in order to locate the tone arm at the desired position on a record or at its rest position.

It will now therefore be seen that my new and improved tone arm and cartridge arrangement provides a simple and efficient means for pivotally supporting the cartridge on the free end of a tone arm. It will be further understood that the present invention provides a novel and effective means for cushioning relative movement of a pivotally supported cartridge with respect to a tone arm.

While in accordance with the Patent Statutes, I have described what at present is considered to be the preferred embodiment of my invention, it will be obvious to those skilled in the art that various changes and modifications may be made therein without departing from the invention and I, therefore, aim in the following claims to cover all such equivalent variations as fall within the true spirit and scope of the invention.

What I claim as new and desire to secure by Letters Patent of the United States is:

1. A tone arm and cartridge assembly comprising an elongated tone arm, means adjacent one end of said tone arm for mounting said tone arm for pivotal movement about a substantially horizontal first axis, a carrier member supported by said tone arm adjacent the other end thereof for pivotal movement about a substantially horizontal second axis, said second axis being generally perpendicular to said elongated tone arm adjacent said other end thereof, a cartridge including a record-tracking stylus secured to said carrier member and substantially disposed on one side of said second axis, means on the other side of said second axis for counterbalancing said carrier member by an amount requisite to allow said carrier member to pivot in seesaw fashion upon said tone arm about said second axis, thereby to allow said cartridge to float freely about said second axis relative to said tone arm, and resilient elastomeric damping means arranged between adjacent surfaces of said carrier member and said tone arm for cushioning relative movement of said carrier member with respect to said tone arm.

2. A tone arm and cartridge assembly comprising an elongated tone arm, means for supporting one end of said tone arm for pivotal movement about a substantially horizontal first axis, an elongated carrier member supported by said tone arm adjacent the other end thereof for pivotal movement about a substantially horizontal second axis, said second axis being generally perpendicular to said elongated tone arm adjacent said other end thereof, a cartridge including a record-tracking stylus secured to said carrier member and substantially disposed on one side of said second axis, means including the distribution of the masses of said carrier member and said cartridge relative to said second axis for maintaining said carrier member and said cartridge in a freely floating normal position relative to said tone arm, and resilient elastomeric damping means arranged between adjacent surfaces of the carrier member and the tone arm for cushioning relative movement of the carrier member with respect to the tone arm.

3. The tone arm and cartridge assembly of claim 2 wherein the resilient damping means is constructed from butyl material and the damping means is spaced from the carrier member when said carrier member and cartridge are in the normal position relative to the tone arm.

References Cited by the Examiner

UNITED STATES PATENTS

| | | | |
|---|---|---|---|
| 2,617,895 | 11/1952 | Angle et al. | 274—24 |
| 2,643,886 | 6/1953 | Ghilini et al. | 274—24 X |
| 2,869,877 | 1/1959 | Bard | 274—23.1 |

NORTON ANSHER, *Primary Examiner.*

C. B. PRICE, *Assistant Examiner.*